United States Patent
Nishimura

(10) Patent No.: US 6,836,772 B1
(45) Date of Patent: Dec. 28, 2004

(54) KEY WORD DERIVING DEVICE, KEY WORD DERIVING METHOD, AND STORAGE MEDIUM CONTAINING KEY WORD DERIVING PROGRAM

(75) Inventor: Hideki Nishimura, Tenri (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/420,238

(22) Filed: Oct. 19, 1999

(30) Foreign Application Priority Data

Oct. 22, 1998 (JP) .......................................... 10-300720

(51) Int. Cl.⁷ ................................................ G06F 7/00
(52) U.S. Cl. ................................... 707/5; 707/3; 707/4
(58) Field of Search .................................... 707/5, 4, 3

(56) References Cited

U.S. PATENT DOCUMENTS

| | | | |
|---|---|---|---|
| 5,293,552 A | * 3/1994 | Aalbersberg | 707/5 |
| 5,642,502 A | * 6/1997 | Driscoll | 707/5 |
| 5,708,825 A | * 1/1998 | Sotomayor | 715/501.1 |
| 5,724,571 A | * 3/1998 | Woods | 707/5 |
| 5,857,179 A | * 1/1999 | Vaithyanathan et al. | 707/2 |
| 5,907,840 A | * 5/1999 | Evans | 707/5 |

FOREIGN PATENT DOCUMENTS

JP A8202737 8/1996

OTHER PUBLICATIONS

H.P. Edmundson, "New Methods in Automatic Extracting", Journal of the Association for Computing Machinery, vol. 16, No. 2, Apr., 1969, pp. 264–285.*

* cited by examiner

*Primary Examiner*—Stephen S. Hong
*Assistant Examiner*—Adam Queler
(74) *Attorney, Agent, or Firm*—Birch, Stewart, Kolasch & Birch, LLP

(57) ABSTRACT

The present invention produces class-specific key words from a document set. In particular, an importance of a word is defined to take into account the number of documents in a corresponding class. A class may be for example, a class of author. An importance value of a word is based on a ratio of the count value of a word in a corresponding class to the number of documents in the class, less the ratio of the count value of the word in other classes to the number of documents in the other classes. Words are sorted by importance in each class. A characteristic key word in each class may be derived from the target document set. In an alternative embodiment, instead of a difference in ratios, the first ratio is divided by the second ratio. By using the alternative approach to calculating importance, the variation in the magnitude of the importance will not be effected by the number of documents.

7 Claims, 23 Drawing Sheets

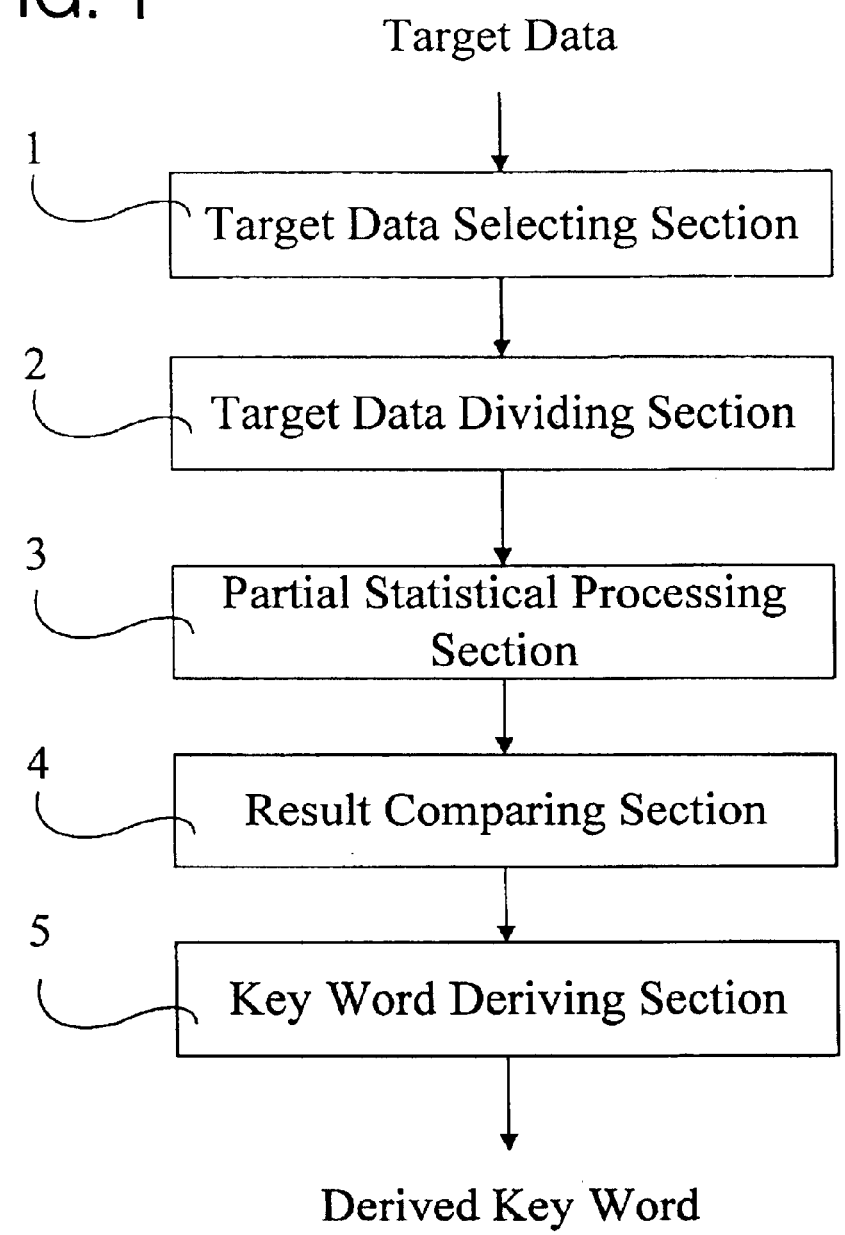

FIG. 3

| no. | Author | Word(Appearance) |
|---|---|---|
| 1 | Executive A | advanced(10), technology(5), digital(4) |
| 2 | Planner A | colorful(7), digital(3), HDTV(2), advanced(2) |
| 3 | Engineer A | digital(6), communication(5), specification(3) |
| 4 | Engineer B | digital(4), communication(8) |
| 5 | Executive B | advanced(8), digital(6), technology(7), cyberspace(5), HDTV(4) |
| 6 | Engineer C | technology(3), HDTV(6) |
| 7 | Executive B | technology(6), business(4), cyberspace(5) |
| 8 | Planner B | colorful(3), HDTV(3), fine(4), communication(2) |
| 9 | Executive C | business(5), communication(2), digital(8) |
| 10 | Executive C | advanced(7), technology(4) |
| 11 | Engineer C | specification(3), digital(8), protocol(5) |
| 12 | Planner C | colorful(6), digital(4), fine(4) |

FIG. 5

| Word |
|---|
| advanced(10), technology(5), digital(4), |
| advanced(8), digital(6), technology(7), |
| cyberspace(5), HDTV(4), |
| technology(6), business(4), cyberspace(5), |
| business(5), communication(2), digital(8), |
| advanced(7), technology(4) |

FIG. 6

| Word |
|---|
| colorful(7), digital(3), HDTV(2), advanced(2), |
| colorful(3), HDTV(3), fine(4), communication(2), |
| colorful(6), digital(4), fine(4) |

FIG. 7

| Word |
|---|
| digital(6), communication(5), specification(3), |
| digital(4), communication(8), |
| technology(3), HDTV(6), |
| specification(3), digital(8), protocol(5) |

FIG. 8

| Author | Author class |
|---|---|
| Executive A | Executive |
| Executive B | Executive |
| Executive C | Executive |
| Planner A | Planner |
| Planner B | Planner |
| Planner C | Planner |
| Engineer A | Engineer |
| Engineer B | Engineer |
| Engineer C | Engineer |

FIG. 10

| Word | Count |
|---|---|
| advanced | 25 |
| technology | 22 |
| digital | 18 |
| cyberspace | 10 |
| business | 9 |
| HDTV | 4 |
| communication | 2 |

FIG. 11

| Word | Count |
|---|---|
| colorful | 16 |
| fine | 8 |
| digital | 7 |
| HDTV | 5 |
| advanced | 2 |
| communication | 2 |

FIG. 12

| Word | Count |
| --- | --- |
| digital | 18 |
| communication | 13 |
| specification | 6 |
| technology | 3 |
| HDTV | 6 |
| protocol | 5 |

FIG. 14

| Word | Importance |
|---|---|
| advanced | 4.714 |
| technology | 3.971 |
| business | 1.800 |
| digital | 0.028 |
| cyberspace | 2.000 |
| HDTV | -0.771 |
| communication | -1.742 |

FIG. 15

| Word | Importance |
|---:|---:|
| colorful | 5.333 |
| HDTV | 0.555 |
| fine | 2.666 |
| digital | -1.666 |
| advanced | -2.111 |
| communication | -1.000 |

FIG. 16

| Word | Importance |
|---:|---:|
| digital | 1.375 |
| specification | 1.500 |
| communication | 2.750 |
| technology | -2.000 |
| HDTV | 0.375 |
| protocol | 1.250 |

FIG. 18

| Word | Importance |
|---|---|
| advanced | 4.714 |
| technology | 3.971 |
| cyberspace | 2.000 |
| business | 1.800 |
| digital | 0.028 |
| HDTV | -0.771 |
| communication | -1.742 |

FIG. 19

| Word | Importance |
|---|---|
| colorful | 5.333 |
| fine | 2.666 |
| HDTV | 0.555 |
| communication | -1.000 |
| digital | -1.666 |
| advanced | -2.111 |

FIG. 20

| Word | Importance |
| --- | --- |
| communication | 2.750 |
| digital | 1.375 |
| specification | 1.500 |
| protocol | 1.250 |
| HDTV | 0.375 |
| technology | -2.000 |

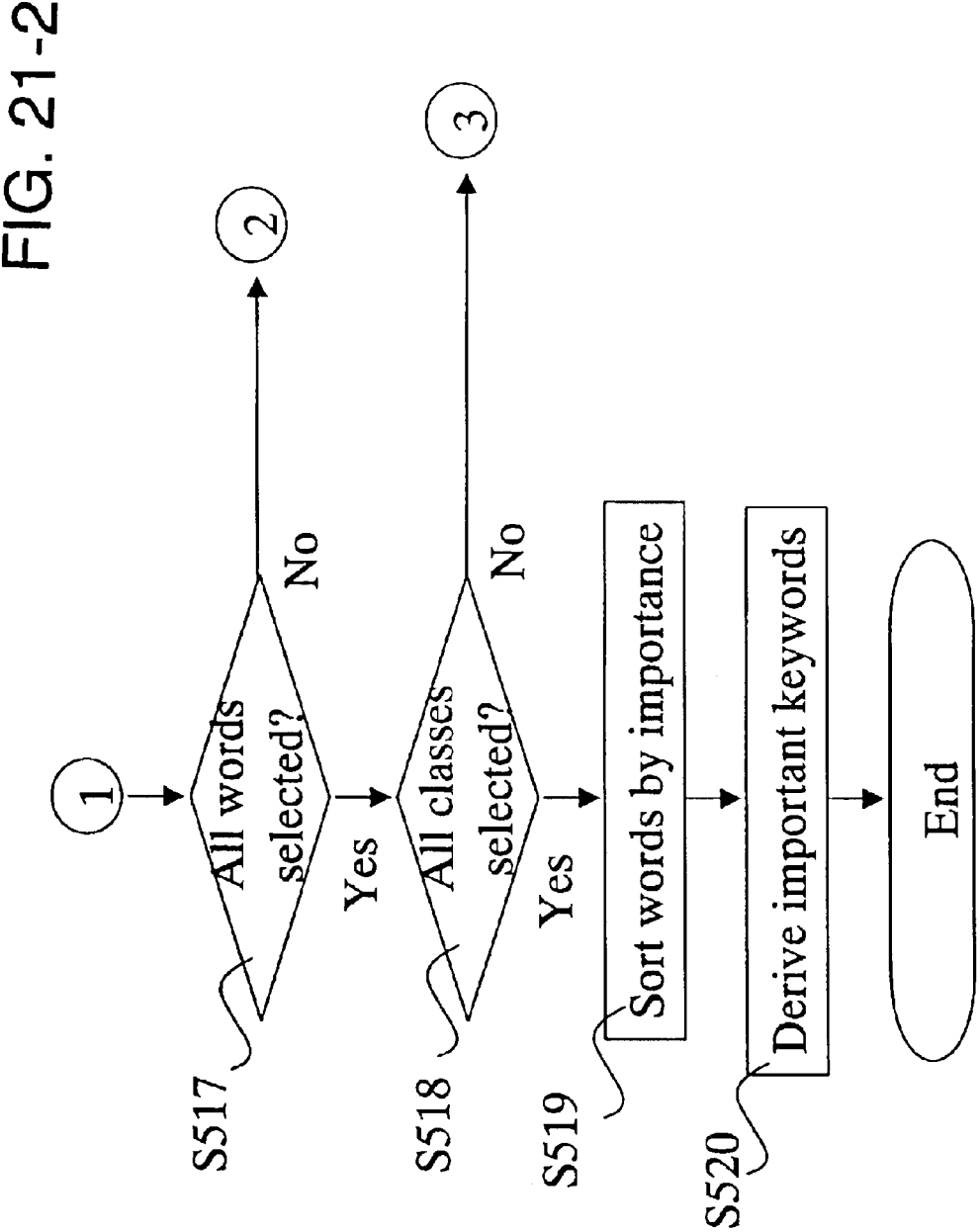

FIG. 22

| Word | Statistic | Count |
| --- | --- | --- |
| advanced | 6.825 | 27 |
| technology | 5.971 | 25 |
| cyberspace | 2.000 | 10 |
| business | 1.800 | 9 |
| digital | 3.069 | 43 |
| HDTV | 1.701 | 15 |
| communication | 5.492 | 17 |
| specification | 1.500 | 6 |
| colorful | 5.333 | 16 |
| fine | 2.666 | 8 |
| protocol | 1.250 | 5 |

FIG. 23

| Word | Statistic | Count | Statistic/Count |
|---|---|---|---|
| digital | 3.069 | 43 | 0.071 |
| HDTV | 1.701 | 15 | 0.113 |
| cyberspace | 2.000 | 10 | 0.200 |
| business | 1.800 | 9 | 0.200 |
| technology | 5.971 | 25 | 0.238 |
| specification | 1.500 | 6 | 0.250 |
| protocol | 1.250 | 5 | 0.250 |
| advanced | 6.825 | 27 | 0.252 |
| communication | 5.492 | 17 | 0.323 |
| colorful | 5.333 | 16 | 0.333 |
| fine | 2.666 | 8 | 0.333 |

KEY WORD DERIVING DEVICE, KEY WORD DERIVING METHOD, AND STORAGE MEDIUM CONTAINING KEY WORD DERIVING PROGRAM

CROSS-REFERENCES TO RELATED APPLICATIONS

This application is related to Japanese patent application No. HEI 10-300720 filed on Oct. 22, 1998 whose priority is claimed under 35 USC §119, the disclosure of which is incorporated herein by reference in its entirety.

BACKGROUND OF THE INVENTION

1. Field of the Invention

The present invention relates to a key word deriving device, a key word deriving method, and a storage medium containing a key word deriving program. More particularly, it relates to a key word deriving device and a key word deriving method for deriving a key word from a large amount of data that characterizes the data by performing a statistical process on a partial region of the data, and a storage medium containing a program for deriving the key word.

2. Description of the Related Art

Japanese Unexamined Patent Publication No. HEI 08(1996)-202737 discloses a method for deriving a key word from a large amount of data by performing a statistical process on a partial region of the data. In this publication, a specification of a patent is used as an example, where the whole data are divided into individual paragraphs by referring to preliminarily prepared index words such as "Title of the Invention" or "What is claimed is" to determine the number of concurrences of each word with another word in the same sentence, the number of concurrences of each word with another word in the same paragraph, and the number of appearances of each word in the whole data, and then, after suitable coefficients are multiplied to these numbers, an arithmetic sum is calculated to determine an importance of each word to derive a key word.

In other words, the key word is not determined simply by using a frequency of appearances of each word, but words that appear concurrently with each other in the same sentence or in the same paragraph are regarded as having a greater importance (more relevance as a key word).

However, according to the key word deriving method disclosed in the above-mentioned Japanese Unexamined Patent Publication, the paragraphs are divided by using preliminarily prepared index words (such as "Title of the Invention") on the basis of the special characteristics of the target data, so that the method of dividing the paragraphs is fixed. Also, the derived key word is a key word for the whole target data, so that the key word for each paragraph is not derived.

Therefore, there does not occur any great problem if the target data are such that each paragraph has its respective fixed meaning such as in a patent specification and the contents are complete in themselves in one document of the specification. However, the key word deriving method disclosed in this publication cannot be applied to a case in which the target data are, for example, a set of (electronic) mail sentences received/sent by an individual person or a set of news sentences in a day or in a month, i.e. when the target data are a set of data divisible by various parameters such as the sender/receiver or the time of occurrence (date and time), because it is difficult to grasp the contents of the whole target data.

SUMMARY OF THE INVENTION

The present invention provides a key word deriving device comprising: a document data acquiring section for acquiring document data each having a parameter previously added thereto; a document data dividing section for dividing the acquired document data for each type of the parameter by distinguishing the types of parameters of the document data; a document table registering section for assigning the type of the parameter to the divided document data as divided data and for registering, in a document table, words contained in the divided data and their statistical amounts; a word table registering section for calculating and registering, in a word table, the statistical amounts of the words in the divided data having the same type of the parameter added thereto by referring to the document table; an importance table registering section for calculating an importance of each word in accordance with a preliminarily prepared importance calculation formula by referring to the word table and for registering the importance of each word in an importance table; and a key word deriving section for deriving a word having a higher importance as a key word by referring to the importance table.

According to the present invention, various and numerous document data can be divided appropriately by using a parameter added to each document data, and an importance of each word is calculated from the words contained in the divided data and their statistical amounts, and a word having a high importance is derived as a keyword, thereby enabling derivation of the keywords which show more accurately the characteristics of each of the divided data in various and numerous document data.

BRIEF DESCRIPTION OF THE DRAWINGS

The present invention will be better understood from the following detailed description of preferred embodiments of the invention, taken in conjunction with the accompanying drawings, in which;

FIG. 1 is a block diagram showing a functional construction of a key word deriving device as an embodiment of the present invention;

FIG. 3 is an explanatory view showing an example of a document table according to this embodiment of the present invention;

FIG. 5 is an explanatory view showing an example of a word list corresponding to the parameter of an "executive" class according to this embodiment of the present invention;

FIG. 6 is an explanatory view showing an example of a word list corresponding to the parameter of a "planner" class according to this embodiment of the present invention;

FIG. 7 is an explanatory view showing an example of a word list corresponding to the parameter of an "engineer" class according to this embodiment of the present invention;

FIG. 8 is an explanatory view showing an example of an author class table according to this embodiment of the present invention;

FIG. 10 is an explanatory view showing an example of a word count table corresponding to the parameter of the "executive" class according to this embodiment of the present invention;

FIG. 11 is an explanatory view showing an example of a word count table corresponding to the parameter of the "planner" class according to this embodiment of the present invention;

FIG. 12 is an explanatory view showing an example of a word count table corresponding to the parameter of the "engineer" class according to this embodiment of the present invention;

FIG. 14 is an explanatory view showing an example of a word importance table of the "executive" class according to this embodiment of the present invention;

FIG. 15 is an explanatory view showing an example of a word importance table of the "planner" class according to this embodiment of the present invention;

FIG. 16 is an explanatory view showing an example of a word importance table of the "engineer" class according to this embodiment of the present invention;

FIG. 18 is an explanatory view showing an example of a word importance table of the "executive" class with sorted importances according to this embodiment of the present invention;

FIG. 19 is an explanatory view showing an example of a word importance table of the "planner" class with sorted importances according to this embodiment of the present invention;

FIG. 20 is an explanatory view showing an example of a word importance table of the "engineer" class with sorted importances according to this embodiment of the present invention;

FIGS. 21-1 and 21-2 are flow charts showing an operation procedure (2) in the key word deriving section according to this embodiment of the present invention;

FIG. 22 is an explanatory view showing an example of a word statistics table according to this embodiment of the present invention; and FIG. 23 is an explanatory view showing an example of a word statistics table with sorted statistical values according to this embodiment of the present invention.

DETAILED DESCRIPTION OF THE PREFERRED EMBODIMENTS

Figure 2:
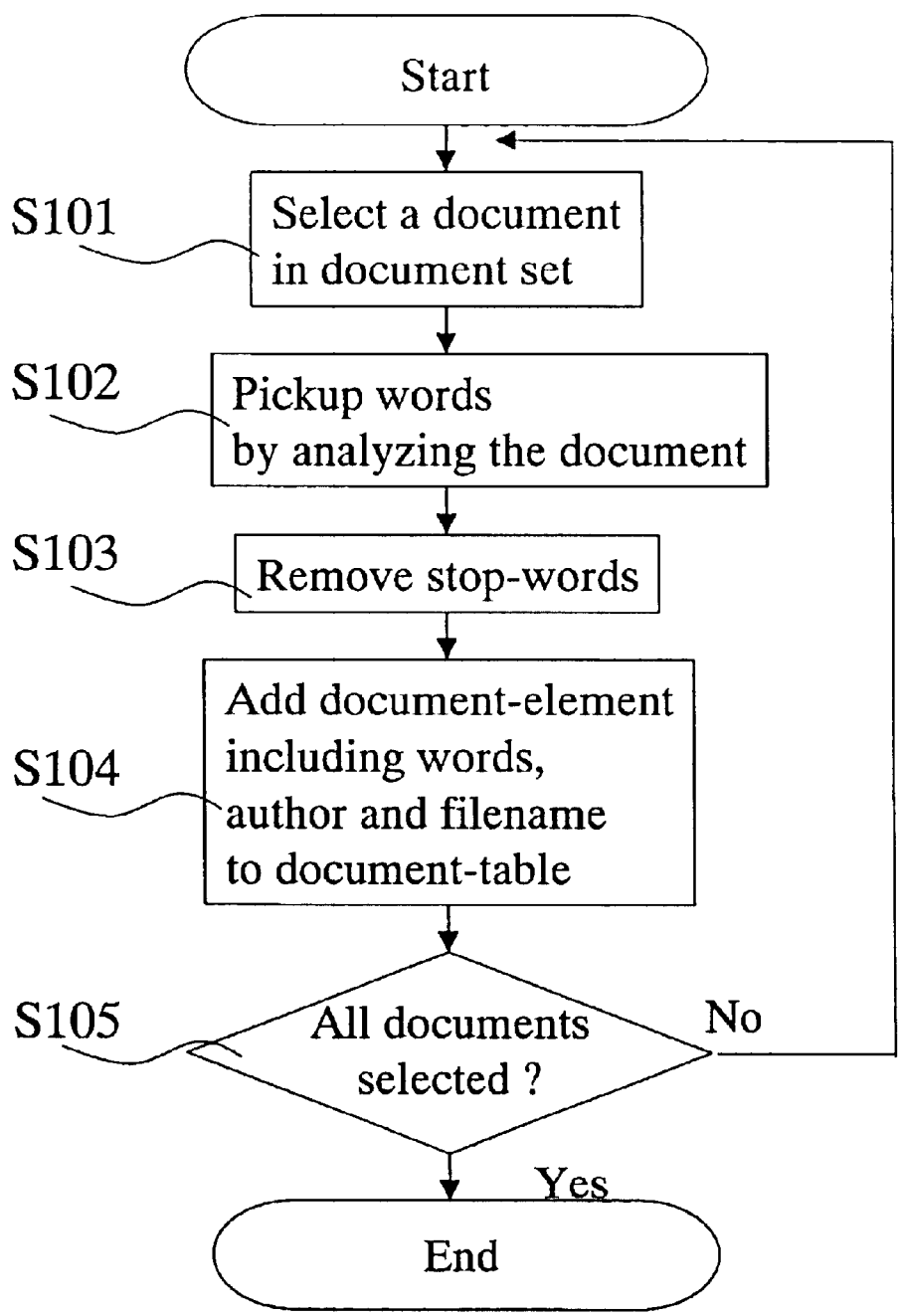
FIG. 2 is a flow chart showing an operation procedure in a target data selecting section according to this embodiment of the present invention.

A key word deriving device according to the present invention may include a document data acquiring section, a document data dividing section, a document table registering section, a word table registering section, a key word deriving section, a document table, a word table, and an importance table. Here, the word "to derive" is used to include the meaning of the word "to extract" throughout this specification and the claims.

The document table, the word table, and the importance table may be constructed, for example, with a storage medium such as a RAM, an EEPROM, a floppy disk, or the like.

The document data acquiring section may be constructed, for example, with an input device including a keyboard, a mouse, a pointing device, or the like, a communication device including a modem, a communication interface, or the like, and a CPU of a computer, and may acquire document data each having a parameter added thereto, from a communication line or a database.

The document data dividing section may be constructed, for example, with a CPU and a program and may divide the document data, which is acquired by the document data acquiring section, for each type of the parameter by distinguishing the types of parameters of the document data.

The document table registering section may be constructed, for example, with a CPU and a program and may assign the type of the parameter to the divided document data as divided data and may register, in a document table, words contained in each of the divided data and their statistical amounts.

The word table registering section may be constructed, for example, with a CPU and a program and may calculate and register, in a word table, the statistical amounts of the words in the divided data having the same type of a parameter added thereto by referring to the document table. The importance table registering section may be constructed, for example, with a CPU and a program and may calculate an importance of each word in accordance with a preliminarily prepared importance calculation formula by referring to the word table and may register the importance of each word in an importance table.

The key word deriving section may be constructed, for example, with a CPU and a program and may derive a word having a higher importance as a keyword by referring to the importance table.

The document data dividing section may use a parameter including an attribute information preliminarily added to each document data for distinguishing the document data registered in a file.

The importance table registering section may further include an importance calculating section for performing the same importance calculation for the words registered in each word table.

The key word deriving section may derive a key word for each of the divided data having the same type of a parameter added thereto.

The key word deriving section may accumulate the importances registered in each importance table and may derive a key word for the whole document data in accordance with the accumulated importances.

According to another aspect of the present invention, there is provided a storage medium containing a key word deriving program that causes a computer operation to perform: a document data acquiring function for acquiring document data each having a parameter previously added thereto; a document data dividing function for dividing the acquired document data for each type of the parameter by distinguishing the types of parameters of the document data; a document table registering function for assigning the type of the parameter to the divided document data as divided data and for registering, in a document table, words contained in the divided data and their statistical amounts; a word table registering function for calculating and registering, in a word table, the statistical amounts of the words in the divided data having the same type of a parameter added thereto by referring to the document table; an importance table registering function for calculating an importance of each word in accordance with a preliminarily prepared importance calculation formula by referring to the word table and for registering the importance of each word in an importance table; and a key word deriving function for deriving a word having a higher importance as a key word by referring to the importance table.

According to this construction, the key word deriving device of the present invention can be provided by installing the key word deriving program, which is stored in the storage medium, into a program storing section of a programmable personal computer or an information processing device.

According to still another aspect of the present invention, there is provided a key word deriving method comprising the steps of: acquiring document data each having a parameter previously added thereto; dividing the acquired document data for each type of the parameter added to the document data; performing a partial statistical process for words included in each of the divided document data; calculating an importance of each word subjected to the partial statistical process for each of the divided document data; and deriving a word having a higher importance as a keyword for each of the divided document data.

In other words, the present invention allows a large amount of data to be divided into plural parts by using a parameter as desired. The desired parameter may be any attribute added to the target data. For example, mails as the target data may be divided into a group of mails to be sent to the outside of a company and a group of mails to be sent to the inside of the company; alternatively, the mails may be divided based on an occurrence date or time of each mail; still alternatively, the mails may be divided into a group of mails for a particular person and a group of the other mails; and so on.

Next, the words included in the data are statistically processed for each of the divided groups. This statistical process may be simply an appearance frequency of the words or may alternatively be the number of concurrences with another word.

Further, a comparison of the result of the statistical processing for each of the divided groups is carried out. In performing the comparison, the statistical process for each of the divided group is preferably unified, whether it may be the simple appearance frequency or the number of concurrences with another word. The comparison may be performed specifically by determining the difference or the ratio of the statistical results.

Namely, the word which has a large appearance frequency or a large number of concurrences with another word in one division region and which has a small appearance frequency or a small number of concurrences with another word in the other division regions is regarded as having a high importance (relevance as a key word).

Finally, a key word is determined from the words that are regarded as having a high importance in each of the divided groups. This may be determined as a key word for each of the divided groups or alternatively as a key word for the whole data. The most preferable judgment is to determine the properties of the whole data in relation to the attribute used in the initial division, by determining a key word for division based on a certain attribute and determining another key word for division based on another attribute.

Hereafter, the present invention will be explained with reference to embodiments thereof shown in the attached drawings. However, these embodiments and the drawings are not intended to limit the scope of the present invention.

Figures 1, 21:
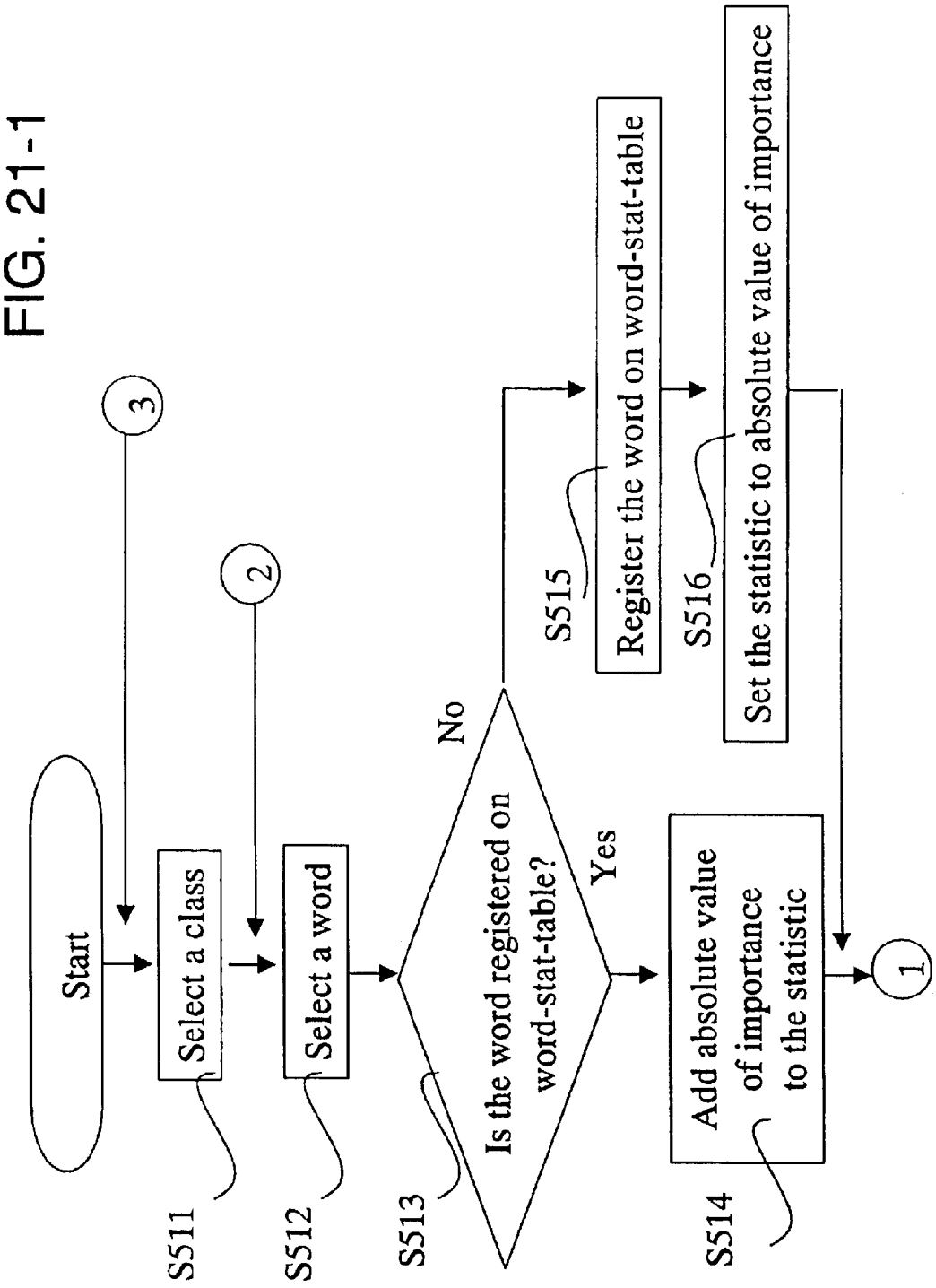

FIG. 1 is a block diagram showing a functional construction of a key word deriving device according to one embodiment of the present invention. Referring to FIG. 1, the key word deriving device performs the functions of a target data selecting section 1, a target data dividing section 2, a partial statistical processing section 3, a result comparing section 4, and a key word deriving section 5.

A hardware of the key word deriving device may be constructed, for example, with a computer including a CPU, a ROM, a RAM, and an I/O port; a storage medium including a RAM, ROM, an EEPROM, a floppy disk, a hard disk, or the like; an input device including a keyboard, a mouse, a pen table, or the like; a communication device including a modem, a communication interface, or the like; a display device such as a liquid crystal display or a plasma display; and a printer such as a thermal printer or a laser printer, although not shown in the drawings. The storage medium functions as a program memory for storing a program to be executed by the CPU and a data memory for storing various data.

The target data selecting section (the document data acquiring section) 1 acquires a document set as a target from which a key word is to be derived, and selects the words and the additional information (parameter) for each document in the document set.

The target data dividing section (document data dividing section) 2 divides the document set into N partial document sets (divided data) by utilizing the additional information of each document (assuming the number of types of the additional information is N).

The partial statistical processing section 3 counts a statistical value (such as appearance frequencies) of the words in each of the N divided partial document sets and registers the statistical value in a word table. In other words, the partial statistical processing section 3 serves both as a document table registering section for assigning the type of the additional information (parameter) to the partial document set divided by the target data dividing section and for registering, in a document table, words contained in each partial document set and their statistical amounts, and as a word table registering section for calculating and registering, in a word list (word table), the statistical amount of the words in the partial document set having the same type of a parameter added thereto by referring to the document table.

The result comparing section 4 compares the statistical results on the basis of the obtained N statistics and detects a difference to determine an importance of each word. In other words, the result comparing section 4 serves as an importance table registering section for calculating an importance of each word in accordance with a preliminarily prepared importance calculation formula by referring to each word list and for registering the importance of each word in an importance table.

The key word deriving section 5 derives a word having a high importance as a key word by referring to each importance table and sorting the importances.

Here, the document table, the word list (word table), and the importance table may be stored, for example, in a data memory.

According to another aspect of the present invention, a key word deriving program that causes a computer operation to perform: a document data acquiring function for acquiring document data each having a parameter previously added thereto; a document data dividing function for dividing the acquired document data for each type of a parameter by distinguishing the types of parameters of the document data; a document table registering function for assigning the type of the parameter to the divided document data as divided data and for registering, in a document table, words contained in the divided data and their statistical amounts; a word table registering function for calculating and registering, in a word table, the statistical amounts of the words in the divided data having the same type of a parameter added thereto by referring to the document table; an importance table registering function for calculating an importance of each word in accordance with a preliminarily prepared importance calculation formula by referring to the word table and for registering the importance of each word in an importance table; and a key word deriving function for deriving a word having a higher importance as a key word by referring to the importance table may be installed into a program memory of a key word deriving device from an external storage medium that stores the key word deriving program.

According to this construction, the key word deriving function of the present invention can be mounted by installing the key word deriving program of the present invention into a programmable personal computer or an information processing device.

Hereafter, the operation of the key word deriving device will be explained in detail using a document set of reference materials for development and using "author" as a division criterion. Here, the documents in the document set are in the form of files on a computer each having an author information (attribute), and the document set can be handled as a list of file names. FIG. 2 is a flow chart showing an operation procedure in the target data selecting section 1 according to this embodiment of the present invention.

First, one document is picked up from the document set (S101). The document thus picked up is analyzed to examine the appearance frequencies of the words contained in the document (S102). A method for performing this analysis is not particularly limited and may be a known technique.

Next, stop words (unnecessary words) such as "and", "but" and "this" are removed using a dictionary of stop words (S103). Then, the document including the words and the author's name is added as a document element to a document table (S104). The steps from S101 to S104 are repeated until all the documents in the document set are selected (S105). As a result of this operation, a document table 6 (FIG. 3) is obtained.

Here, the number in the parenthesis following each word represents the number of appearances of the word. Here, it is assumed that the author's name can be specified by utilizing, for example, author information of the file or the like. Here, an example is given in which the number of words in each document is extremely small for simplicity of explanation. However, real documents may of course have a variety of words and large appearance frequencies of the words.

Figure 4:
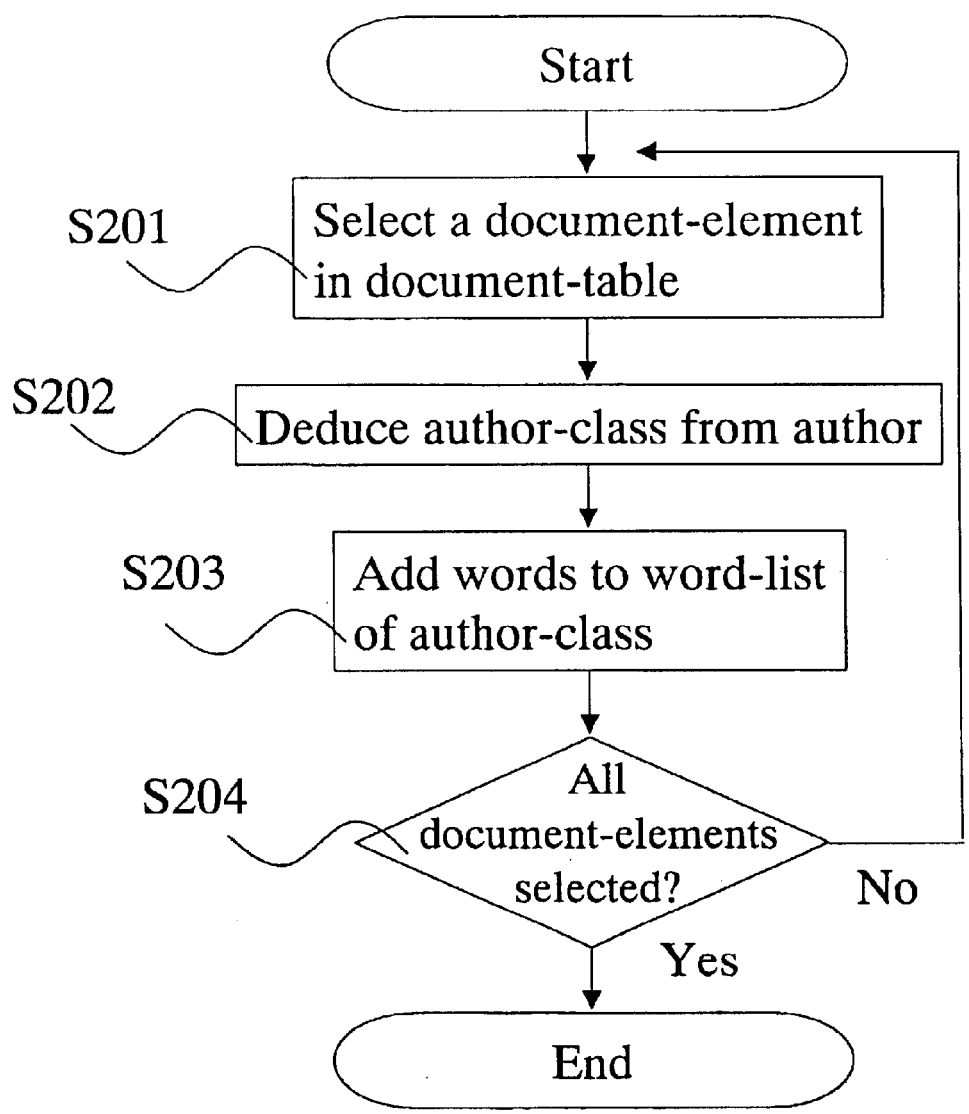
FIG. 4 is a flow chart showing an operation procedure in a target data dividing section according to this embodiment of the present invention.

FIG. 4 is a flow chart showing an operation procedure in the target data dividing section 2 according to this embodiment of the present invention. The steps from S201 to S203 are repeated for every element in the document table 6. First, one document element is selected from the document table 6 (S201). For example, a document element "1 author: executive A, words: advanced (10), technology (5), digital (4)" is selected. Next, the parameter of an author class is determined from the author's name (S202). The author class refers to a group as a division unit of the document set which is divided based on the parameter of the author class. Any number of classes may be provided. However, it is assumed in this example that there are three classes, namely, "executive", "planner", and "engineer". Accordingly, the class is determined to be "executive" for the document element "1 author: executive A; words: advanced (10), technology (5), digital (4)".

Then in accordance with the determined class, the words are added to the word list of the corresponding class (S203). In the case of the document element "1 author: executive A; words: advanced (10), technology (5), digital (4)", the words "advanced (10)", "technology (5)", and "digital (4)" are added to the word list 7 of the "executive" class (FIG. 5). The steps from S201 to S203 are repeated until all the document elements in the document table 6 are selected (S204).

As a result of this operation, a word list 7 (FIG. 5), a word list 8 (FIG. 6), and a word list 9 (FIG. 7) are obtained corresponding to the parameters of the three classes "executive", "planner", and "engineer", respectively. Here, in this example, the author class is directly determined from the author's name. However, the author class may be determined by using an author class table 10 (FIG. 8).

Figure 9:
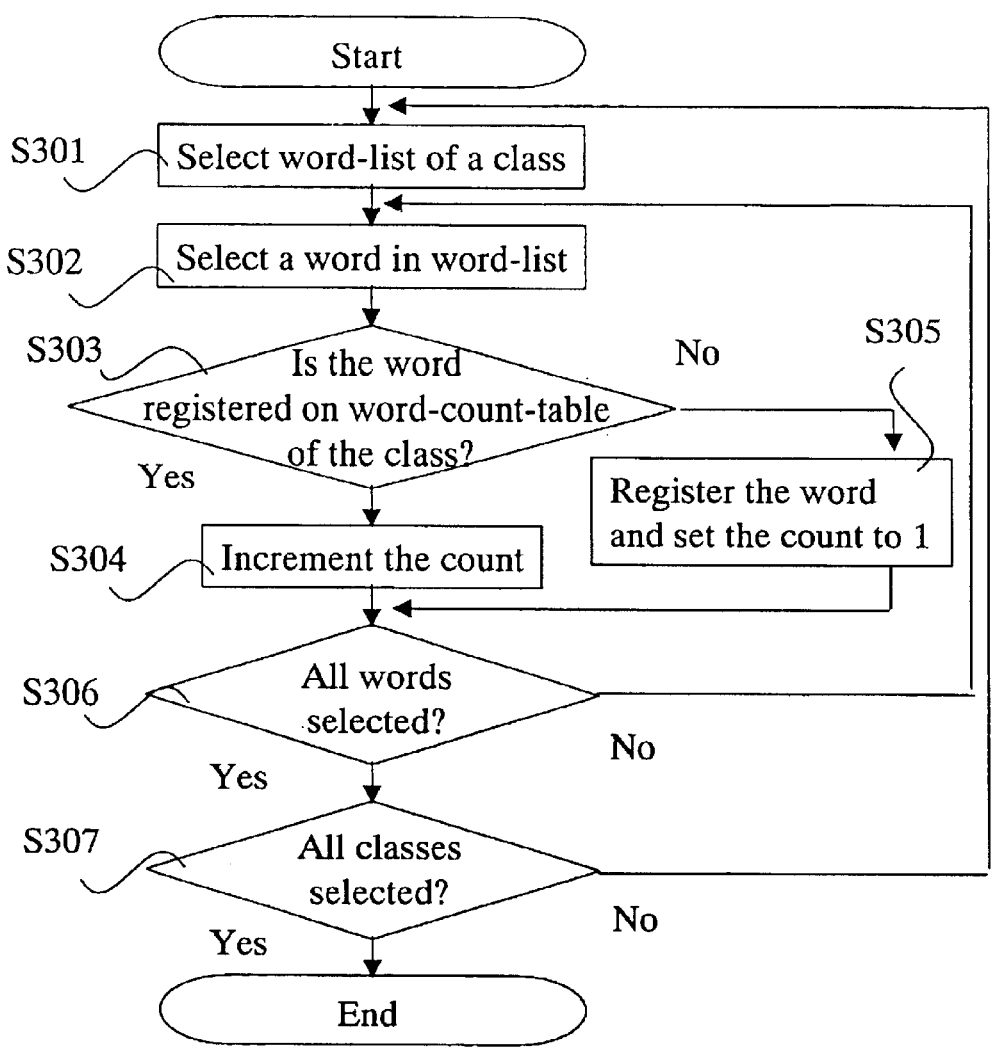
FIG. 9 is a flow chart showing an operation procedure in a partial statistical processing section according to this embodiment of the present invention.

FIG. 9 is a flow chart showing an operation procedure in the partial statistical processing section 3 according to this embodiment of the present invention. The steps from S301 to S306 are repeated for all the classes. First, a word list for one class obtained by the target data dividing section 2 is selected (S301). For example, the word list 7 (FIG. 5) is selected corresponding to the parameter of the "executive" class. The steps from S302 to S305 are repeated for all the words in the selected word list. One word is selected from the selected word list (S302).

For example, a word "advanced (10)" is selected from the word list 7 of the "executive" class. Then, whether the selected word is registered in a word count table or not is examined (S303). If the selected word is already registered in the word count table, the counter corresponding to the selected word is incremented for the number of appearances (S304). If the selected word is not registered in the word count table yet, the selected word is registered in the word count table and the counter is set at the number of appearances of the selected word (S305).

For example, if the "executive" class is selected, the word "advanced (10)" selected from the word list 7 is not registered yet in the word count table 11 at the first time of selection, so that the word "advanced" is registered in the word count table 11 and the counter is set at 10 which is the number of appearances of the word "advanced". However, when the word "advanced (2)" is selected for the second time, the word is already registered in the word count table 11, so that the corresponding counter is incremented by two to set the counter at 12.

The steps from S302 to S305 are repeated until all the words in the selected word list are selected (S306). Then, the steps from S301 to S306 are repeated until all the classes are selected (S307).

As a result of this operation, word count tables 11, 12, and 13 are obtained corresponding to the parameters of the three classes (FIG. 10, FIG. 11, and FIG. 12).

Figure 13:
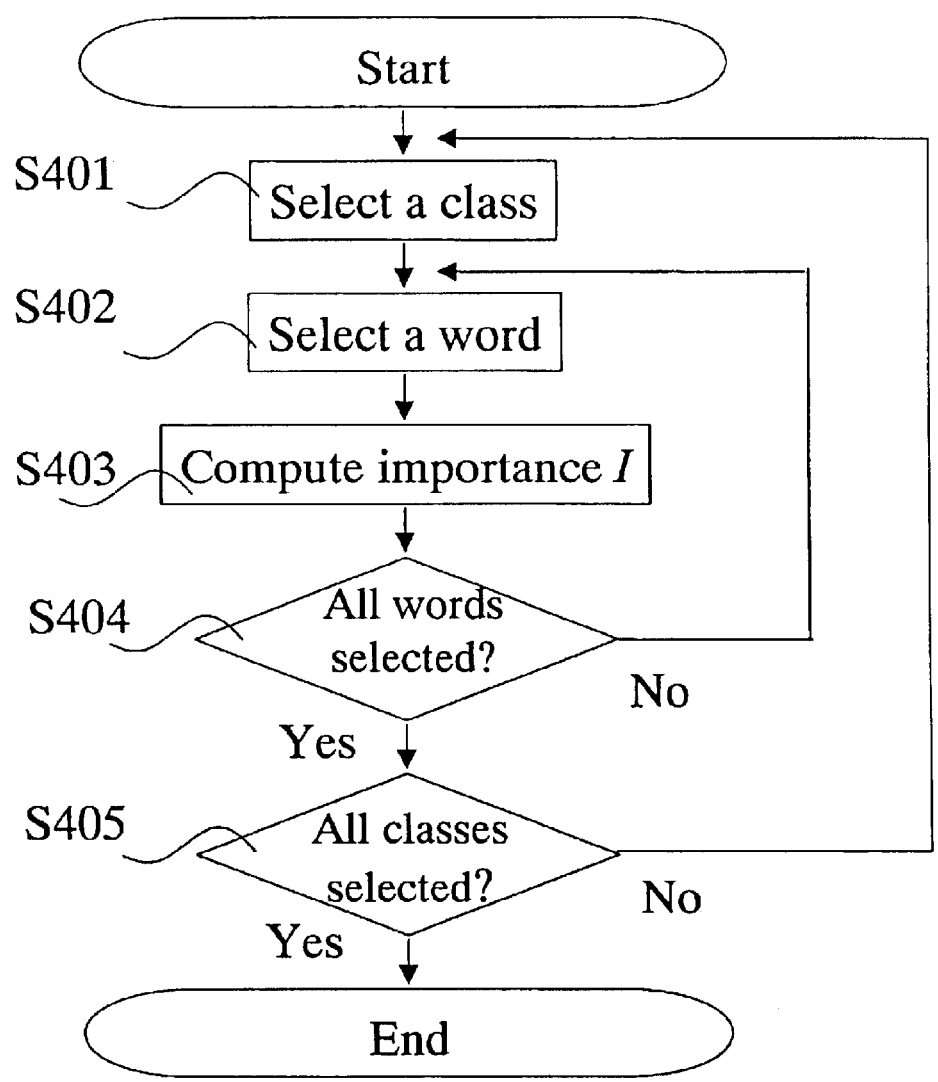
FIG. 13 is a flow chart showing an operation procedure in a result comparing section according to this embodiment of the present invention.

FIG. 13 is a flow chart showing an operation procedure in the result comparing section 4 according to this embodiment of the present invention. The steps from S401 to S404 are repeated until all the classes are selected. First, a target class is selected (S401). For example, the "executive" class is selected if it is desired to derive words from the view point of the executives. The steps from S402 to S403 are repeated until all the words in the corresponding word count table are selected. A word is selected from the word count table of the selected class (S402). For example, a word "advanced" is selected from the word count table 11 of the "engineer" class.

Next, the count value of the word in the corresponding word count table is compared with the count value of the word in the other word count tables to calculate an importance of the selected word, which is then registered into the corresponding word importance table (S403). At this time, the number of documents in each class or the like may be taken into consideration.

For example, the importance I of the word k may be calculated by the following equation.

$$I(k) = \frac{\text{count value of } k \text{ in the corresponding class}}{\text{number of documents in the corresponding class}} - \frac{\text{count value of } k \text{ in the other classes}}{\text{number of documents in the other classes}}$$

By thus using the difference in determining the importance, the magnitude of the absolute value of the count value is reflected on I(k), so that it is suitable in deriving a key word that appears more frequently. The steps from S402 to S403 are repeated until all the words in the corresponding word count table are selected (S404). The steps from S401 to S404 are repeated until all the classes are selected (S405).

As a result of this, word importance tables 14, 15, and 16 are obtained for the respective classes (FIG. 14, FIG. 15, and FIG. 16).

Figure 17:
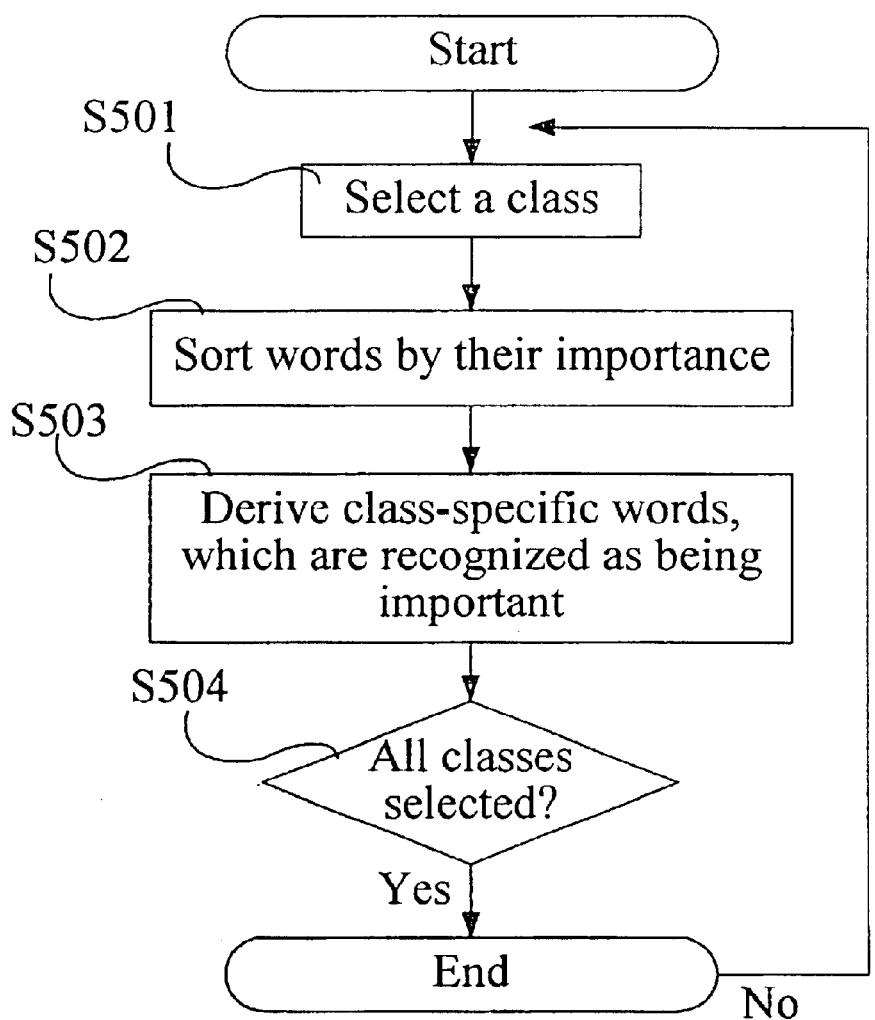
FIG. 17 is a flow chart showing an operation procedure (1) in a key word deriving section according to this embodiment of the present invention.

FIG. 17 is a flow chart showing an operation procedure (1) in the key word deriving section 5 according to this embodiment of the present invention. The steps from S501 to S503 are repeated until all the classes that are the targets of key word derivation are selected. First, a class which is a target of key word derivation is selected (S501). The words in the word importance table corresponding to the selected class are sorted to prepare a sorted word importance table (S502). Then, words appearing in an upper part of the sorted word importance table are picked up as derived keywords (S503). The steps from S501 to S503 are repeated until all the classes that are the targets of keyword derivation are selected (S504).

As a result of this, sorted word importance tables 17, 18, and 19 are obtained in which the word importances in each class are sorted (FIG. 18, FIG. 19, and FIG. 20). By performing the above-mentioned series of steps, a characteristic key word in each class (class-specific key word) may be derived from the target document set.

FIGS. 21-1 and 21-2 are flow charts showing an operation procedure (2) in the key word deriving section 5 according to this embodiment of the present invention. The steps from S511 to S516 are repeated until all the classes are selected. A target class is selected (S511). Then, the steps from S512 to S517 are repeated for all the words in the word importance table corresponding to the selected class. A target word is selected (S512). Whether the selected word is registered in a word statistic table 20 or not is determined (S513). If it is already registered, the absolute value of the importance of the selected word is added to the statistic value of the corresponding word in the word statistic table 20, and further the count value of the selected word is added to the counter of the corresponding word by referring to the word count table of the selected class (S514).

If it is not registered yet, the selected word is registered into the word statistic table (S515). Then, the absolute value of the importance of the selected word is set in the statistic value of the corresponding word in the word statistic table 20, and further the count value of the selected word is set in the counter of the corresponding word by referring to the word count table of the selected class (S516). Alternatively, the square of the importance or the like may be added to the statistic value. The steps from S512 to S516 are repeated until all the words are selected (S517). The steps from S511 to S517 are repeated until all the classes are selected (S518).

Lastly, the words in the word statistic table 20 are sorted in the order of increasing statistic value and in the order of decreasing count value to prepare a sorted word statistic table 21 (S519). Specifically, the words in the word statistic table 20 may be sorted at this time, for example, by using a value of coefficient C×statistic value−count value as a criterion; by setting a threshold value in either of the statistic value and the count value for narrowing down and using the remaining values; or by using a value of statistic value/count value as a criterion. Then, words appearing in an upper part of the sorted word statistic table 21 are picked up as derived key words (S520).

The sorted word statistic table 21 thus obtained is shown in FIG. 22. Here, the words in the word statistic table 20 have been sorted in the order of an increasing value of statistic value/count value. By performing the above-mentioned series of steps, key words having a similar appearance tendency in each class may be derived from the target document set.

In this example, the difference between the corresponding class and the other classes is used. Alternatively, the ratio may be used as well. In other words, the importance I in the step S403 in FIG. 13 may be calculated as follows:

$$I(k) = \frac{\text{count value of } k \text{ in the corresponding class}}{\text{number of documents in the corresponding class}} \div \frac{\text{count value of } k \text{ in the other classes}}{\text{number of documents in the other classes}}$$

By using the ratio in determining the importance, the variation in the magnitude of the importance will be great irrespective of the absolute number of documents, so that it is suitable for key word derivation in which the importance is considered irrespective of the number of documents.

At this time, in calculating the statistic value, an upper limit and a lower limit of the importance may be set considering the case in which the importance is infinite. Further, if the importance is less than 1, the reciprocal of the importance may be used instead of the importance, or alternatively an absolute value of the logarithm of the importance may be used to accumulate the difference in the importance. Alternatively, if the reciprocal of the importance is to be used instead of the importance when the importance is less than 1, the statistic value may be multiplied with it instead of adding it to the statistic value in view of the fact that the importance or its reciprocal is equal to or greater than 1.

Further, this example has been explained using document materials for development as the target document set and using the author as the division criterion. However, another desired criterion capable of being a division criterion may be used as well, so that any attribute added to the target data may be used. For example, mails as the target data may be divided into a group of mails to be sent to the outside of a company and a group of mails to be sent to the inside of the company; alternatively, the mails may be divided based on an occurrence date or time of each mail; still alternatively, the mails may be divided into a group of mails for a particular person and a group of the other mails; and so on.

In various retrieval systems, user accesses are often recorded as logs. In such a case, the access logs may contain the accessing users' IDs, the accessing time, or the retrieval keys (key words in most cases). Accordingly, the log for one access of a user may be treated as one document, whereby the whole access logs constitute a document set. In this case, the data (logs) may be divided using the IDs as a criterion, or alternatively the data may be divided into day and night, week days and holidays or the like using the accessing date and time as a criterion, thereby to examine their respective accessing tendencies.

As shown and described above, according to the key word deriving device, the key word deriving method, or the storage medium containing a key word deriving program of the present invention, a large amount of data divisible by various parameters may be processed to derive a key word for each divided group or a key word for the total data by comparing the difference in the statistical processing result of each divided group, whereby the characteristics of the total data and the specificity and/or tendency of each divided group in the total data may be grasped. Moreover, they do not require a particular data form, and any data form can be used as desired.

In particular, if the difference of the appearance frequency is used in determining the importance of each word, a key word having a higher appearance frequency may be derived. Alternatively, if the ratio of the appearance frequency is used in determining the importance of each word, a key word may be derived in which the importance is considered irrespective of the absolute number of documents.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A key word deriving device comprising:
  a document data acquiring section for acquiring document data each having a parameter previously added thereto and for registering said document data including words and said parameter to a document table;
  a document data dividing section for dividing the acquired document data for each type of the parameter by distinguishing the types of parameters of the document data,
  and for generating a word list of words contained in the divided data and their statistical amounts;
  a word table registering section for calculating and registering, in a word-count table, the statistical amounts of the words in the divided data having the same type of the parameter added thereto by referring to the word list;
  an importance table registering section for calculating an importance of each word based on a ratio of the count value of a word in a corresponding parameter type to the number of documents in the parameter type, divided by the ratio of the count value of the word for other parameter types to the number of documents for the other parameter types, said count value of a word for a corresponding parameter type being obtained by referring to the word-count table, and for registering the importance of each word in an importance table; and
  a keyword deriving section for deriving a word having a higher importance as a key word by referring to the importance table.

2. The key word deriving device of claim 1, wherein the document data dividing section uses a parameter including an attribute information preliminarily added to each document data for distinguishing the document data registered in a file.

3. The key word deriving device of claim 1, wherein the importance table registering section further includes an importance calculating section for performing the same importance calculation for the words registered in a plurality of word-count tables.

4. The key word deriving device of claim 1, wherein the key word deriving section derives a key word for each of the divided data having the same type of a parameter added thereto.

5. The key word deriving device of claim 1, wherein the key word deriving section accumulates the importances registered in a plurality of importance tables and derives a key word for the whole document data in accordance with the accumulated importances.

6. A key word deriving method comprising the steps of:
  acquiring document data each having a parameter previously added thereto;
  dividing the acquired document data for each type of the parameter added to the document data;
  performing a partial statistical process for words included in each of the divided document data;
  calculating an importance of each word subjected to the partial statistical process for each of the divided document data, based on a ratio of a count value of a word in a corresponding parameter type to the number of documents in the parameter type, divided by the ratio of a count value of the word for other parameter types to the number of documents for the other parameter types; and
  deriving a word having a higher importance as a key word for each of the divided document data.

7. A storage medium containing a key word deriving program that causes a computer operation to perform:
  a document data acquiring function for acquiring document data each having a parameter previously added thereto and for registering said document data including words and said parameter to a document table;
  a document data dividing function for dividing the acquired document data for each type of the parameter by distinguishing the types of parameters of the document data,
  and for generating a word list of words contained in the divided data and their statistical amounts;
  a word table registering function for calculating and registering, in a word-count table, the statistical amounts of the words in the divided data having the same type of a parameter added thereto by referring to the word list;
  an importance table registering function for calculating an importance of each word based on a ratio of the count value of a word in a corresponding parameter type to the number of documents in the parameter type, divided by the ratio of the count value of the word for other parameter types to the number of documents for the other parameter types, said count value of a word for a corresponding parameter type being obtained by referring to the word-count table, and for registering the importance of each word in an importance table; and
  a keyword deriving function for deriving a word having a higher importance as a key word by referring to the importance table.

* * * * *